United States Patent
Akamatsu et al.

[11] Patent Number: 5,967,672
[45] Date of Patent: Oct. 19, 1999

[54] MACHINE PARTS MAKING ROLLING OR SLIDING SURFACES FORMED WITH DISCONTINUOUS GROOVES

[75] Inventors: Yoshinobu Akamatsu, Kuwana; Fuyuki Ito, Yokkaichi; Shiro Deguchi, Ianbe-gun, all of Japan

[73] Assignee: NTN Corporation, Osaka, Japan

[21] Appl. No.: 08/608,547

[22] Filed: Feb. 28, 1996

[51] Int. Cl.[6] ............................ F16C 33/58; F16C 33/34; F16C 1/24

[52] U.S. Cl. ...................... 384/516; 384/565; 384/625; 464/11

[58] Field of Search ...................... 384/492, 516, 384/565, 569, 573, 625; 464/7, 11

[56] References Cited

U.S. PATENT DOCUMENTS

| | | | |
|---|---|---|---|
| 1,357,320 | 11/1920 | Hardy | 464/11 |
| 1,885,646 | 11/1932 | Warner | 464/11 |
| 2,595,513 | 5/1952 | Cureton | 464/7 |
| 3,120,746 | 2/1964 | Kayser | 464/11 |
| 5,456,538 | 10/1995 | Honda et al. | 384/625 |
| 5,498,086 | 3/1996 | Ou | 384/565 |
| 5,503,481 | 4/1996 | Hashimoto et al. | 384/569 |
| 5,577,846 | 11/1996 | Takahashi | 384/625 |

FOREIGN PATENT DOCUMENTS

| | | | |
|---|---|---|---|
| 0113822 | 6/1985 | Japan | 464/7 |
| 5209627 | 8/1993 | Japan | 384/569 |
| 1763741 | 9/1992 | U.S.S.R. | 384/569 |
| 2117088 | 10/1983 | United Kingdom | 464/11 |

*Primary Examiner*—Tamara L. Graysay
*Assistant Examiner*—Matthew A. Kaness
*Attorney, Agent, or Firm*—Wenderoth, Lind & Ponack, L.L.P.

[57] ABSTRACT

A rolling or sliding machine part that has an improved oil film formation capacity. The machine part has a rolling or sliding contact surface formed with discontinuous grooves, which are dispersedly arranged and extend across the direction in which the machine part rolls or slides.

15 Claims, 12 Drawing Sheets

Life ratio

Angle θ with respect to rolling direction
(with area rate: 3-30%, max. depth: 4 μm or less)

MACHINE PARTS MAKING ROLLING OR SLIDING SURFACES FORMED WITH DISCONTINUOUS GROOVES

BACKGROUND OF THE INVENTION

This invention relates to rolling or sliding machine parts such as bearings, thrust plates or gears.

Some machine parts make rolling motions while others make sliding motions. In the following description, these motions are referred to as "rolling or sliding motions".

Machine parts which have rolling or sliding motions may suffer damage to their surfaces if an oil film runs out at the contact portion with a mating member due to insufficient lubrication and as a result the machine part is brought into direct contact with the mating member.

To prevent such surface damage due to loss of oil film at the contact portion, conventional machine parts have their surfaces finished as smoothly as possible.

To finish the surfaces as smoothly as possible, they are usually mirror-finished. But mirror finish is a time-consuming and expensive solution.

Today's machine parts are lubricated by less viscous lubricants to reduce friction loss. Also, they are often used in a high-temperature environment and operated at high speeds. Due to these factors, it is becoming more and more difficult to form a sufficiently thick oil film at the contact portion. Thus, even if the surface roughness of the machine part is reduced to the limit by mirror finishing, it is difficult to completely prevent direct contact with the mating member.

An object of the present invention is to provide a rolling or sliding machine part which has an improved surface that permits the formation of a thick oil film thereon so as to provide a long part life.

SUMMARY OF THE INVENTION

According to the present invention, there is provided a machine part which is subject to a rolling or sliding motion. The machine part has a rolling or sliding contact surface formed with a plurality of discontinuous grooves dispersedly arranged and extending across the direction in which the machine part rolls or slides.

The area rate of the discontinuous grooves relative to the rolling or sliding contact surface may be 3–30%. Their maximum depth may be 0.5–4 μm. They may be inclined by 45 to 90 degrees with respect to the direction in which the machine part rolls or slides.

Also, there is provided a machine part having a rolling or sliding contact surface formed with a plurality of discontinuous grooves dispersedly arranged and extending across the direction in which the machine part rolls or slides, and the rolling or sliding contact surface is a smooth surface for the discontinuous grooves, and the volume of the discontinuous grooves is from $50 \times 10^{-4}$ mm$^3$/cm$^2$ to $400 \times 100^{-4}$ mm$^3$/cm$^2$.

The number of the discontinuous grooves may be 1–15 per millimeter in the rolling/sliding direction.

Further, there is provided a machine part having a rolling or sliding contact surface formed with a plurality of discontinuous grooves dispersedly arranged and extending across the direction in which the machine part rolls or slides, and the number of the discontinuous grooves is 5–50 per square millimeter.

Also, there is provided a machine part having a rolling or sliding contact surface formed with a plurality of discontinuous grooves dispersedly arranged and extending across the direction in which the machine part rolls or slides, and some of the discontinuous grooves intersecting with each other.

The rate of intersection of the discontinuous grooves should be more than zero but not more than 20%. The number of the discontinuous grooves may be 5–50 per square millimeter.

Other features and objects of the present invention will become apparent from the following description made with reference to the accompanying drawings, in which:

DETAILED DESCRIPTION OF THE PREFERRED EMBODIMENT

The embodiment is described with reference to the accompanying drawings.

Figure 1:
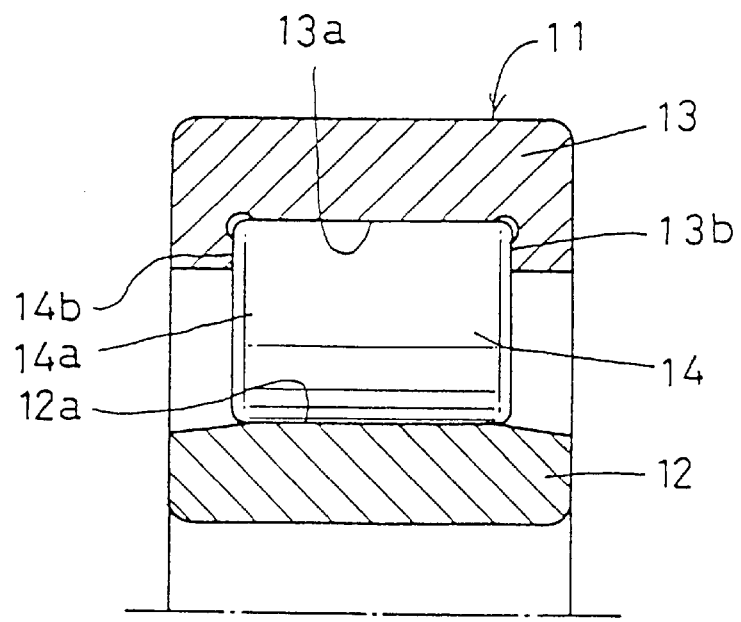
FIG. 1 is a partial sectional view of a rolling bearing.

The cylindrical roller bearing 11 shown in FIG. 1 comprises an inner ring 12, an outer ring 13 and a plurality of rollers 14 disposed between the rings 12 and 13. The bearing elements, i.e. the inner ring 12, outer ring 13 and rollers 14 have, as rolling contact surfaces, a raceway 12a, a raceway 13a and rolling surfaces 14a, respectively. Flange surfaces 13b of the outer ring 13 and roller end faces 14b of the rollers 14 are slide contact surfaces.

Figure 2:
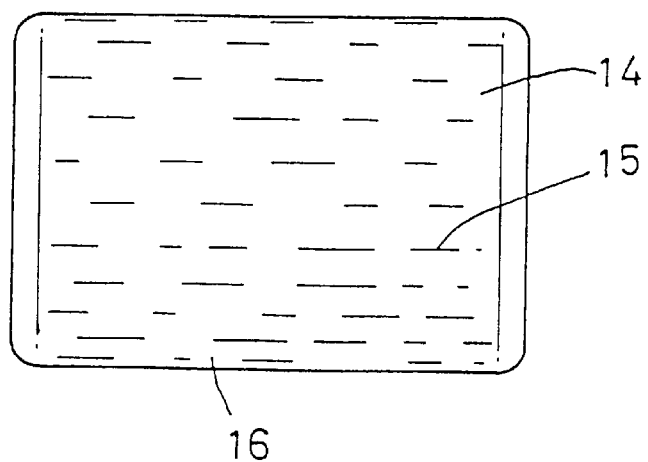
FIG. 2 is an enlarged front view of one of the rollers of the rolling bearing.

As shown in FIG. 2, each of these rolling contact surfaces and slide contact surfaces is formed, entirely or partially, with a plurality of dispersed, discontinuous grooves 15 extending across the rolling or sliding direction. Each groove 15 is discontinuous, i.e. interrupted, in its length direction. The rolling contact surfaces and the slide contact surfaces are superfinished surfaces 16 at portion except the grooves 15. FIG. 2 shows only the rolling contact surface of a roller 14. But the other rolling contact surfaces and the slide contact surfaces are formed with similar grooves and superfinished surfaces.

Figure 3A:
FIGS. 3A to 3C are hand-drawn views of microphotographs of the finished surfaces of test cylinders.
Figure 3B:
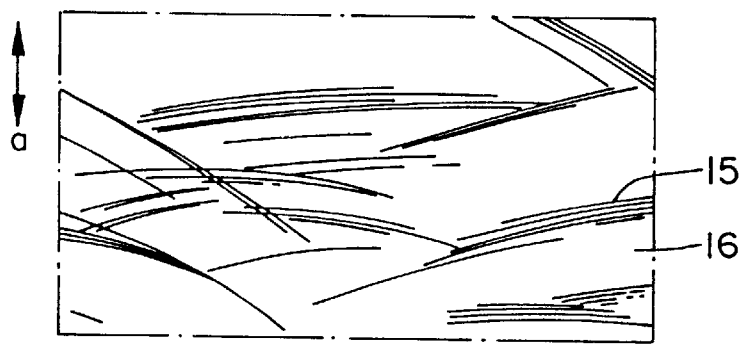
Figure 3C:
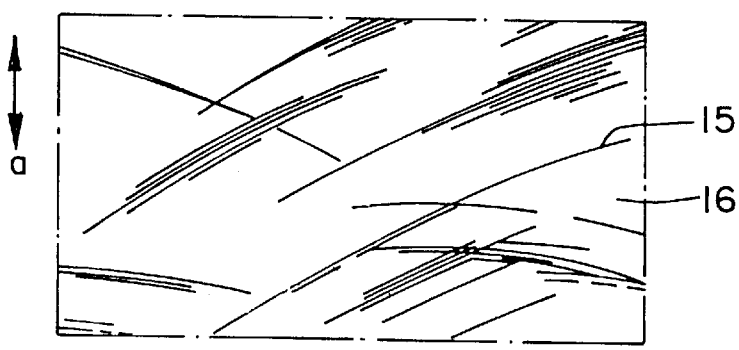
Figure 3C:

FIG. 3A–3C show three kinds of test cylinders 1–3 having a diameter of 12 mm and each formed with different kinds of discontinuous grooves 15. Such grooves 15 are formed by abrasive grains on a grinding wheel when it is discontinuously brought into contact with the test cylinders. The discontinuous grooves shown in FIG. 3A extend perpendicular to the rotating direction (arrow a) of the cylinder. The test cylinder shown in FIG. 3B is formed with both perpendicular and oblique discontinuous grooves 15. The cylinder shown in FIG. 3C has discontinuous grooves 15 that extend in different oblique directions. In any example, the discontinuous grooves 15 are arranged separately from one another or densely bunched together.

The distribution density of the discontinuous grooves 15 with respect to the entire contact surface, and the length and depth of each discontinuous groove 15 are varied according to how each cylindrical surface is brought into contact with a grinding wheel, and the kind of the grinding stone used.

In the examples shown in FIGS. 3A–3C, a grinding wheel having an abrasive grain size of #120 was used. But any grinding wheel having an abrasive grain size within a range of from #54 to #1000 can be used. Each discontinuous groove should have a length not exceeding 1 mm, a width not exceeding 0.06 mm, and a depth not exceeding 0.003 mm. The grooves shown in FIG. 3C are inclined at an angle θ of about 60°.

The test cylinders No. 1–No. 3 were subjected to a rolling fatigue life test. In the test, each test cylinder was rolled in contact with a 20-mm-diameter mating cylinder at Hertz's maximum contact pressure of 3 GPa, and the loaded speed of the test cylinder at 20400 cpm, using a turbine oil as a lubricant.

The mating cylinder used in this test had a surface finished by grinding. The test was made under such lubricating conditions that oil films are difficult to form, with an oil film parameter (oil film thickness/surface roughness) of less than 1.

The contact area between each test cylinder and the mating cylinder had the shape of an ellipse having a minor axis (parallel to the rolling direction) of 0.38 mm and a major axis (perpendicular to the rolling direction) of 8.08 mm. The discontinuous grooves 15 formed on each test cylinder were shorter than the corresponding major or minor axis of the ellipse.

Figure 4:
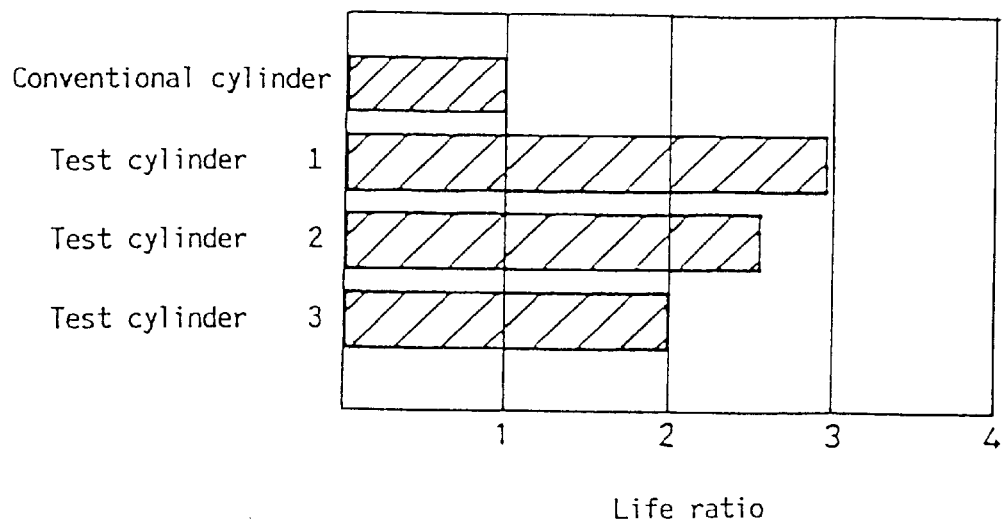
FIG. 4 is a graph showing the results of a life test.

FIG. 4 shows the test results. As shown, any of the test cylinders showed a twice or more longer life than a conventional cylinder. Of the three cylinders, the one formed with perpendicular grooves 15 (No. 1 cylinder) was the longest-lived. But even the cylinder formed with grooves inclined at 60° (No. 3) was sufficiently long-lived in comparison with a conventional cylinder.

Figure 5:
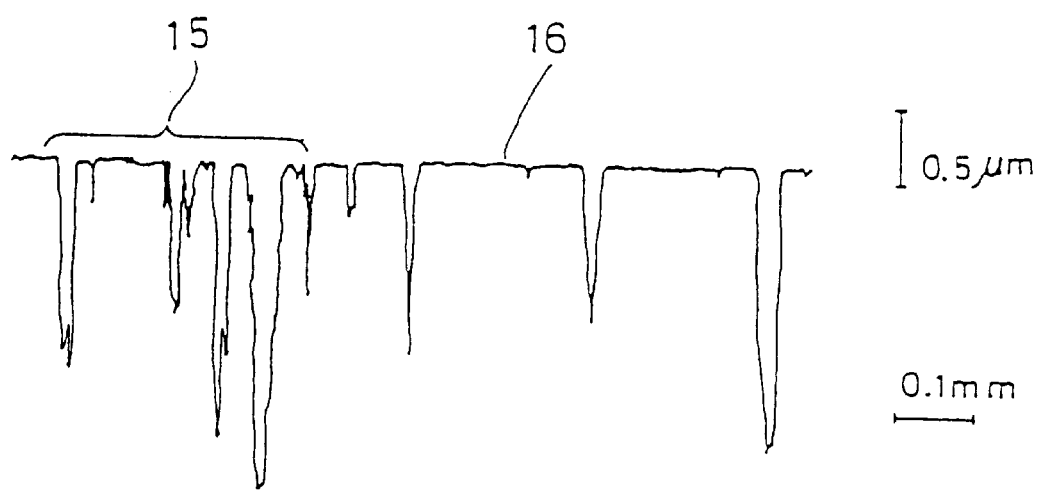
FIG. 5 is a view showing the roughness of the finished surface.

FIG. 5 shows the finished surface condition of one of the test cylinders.

Figure 6:
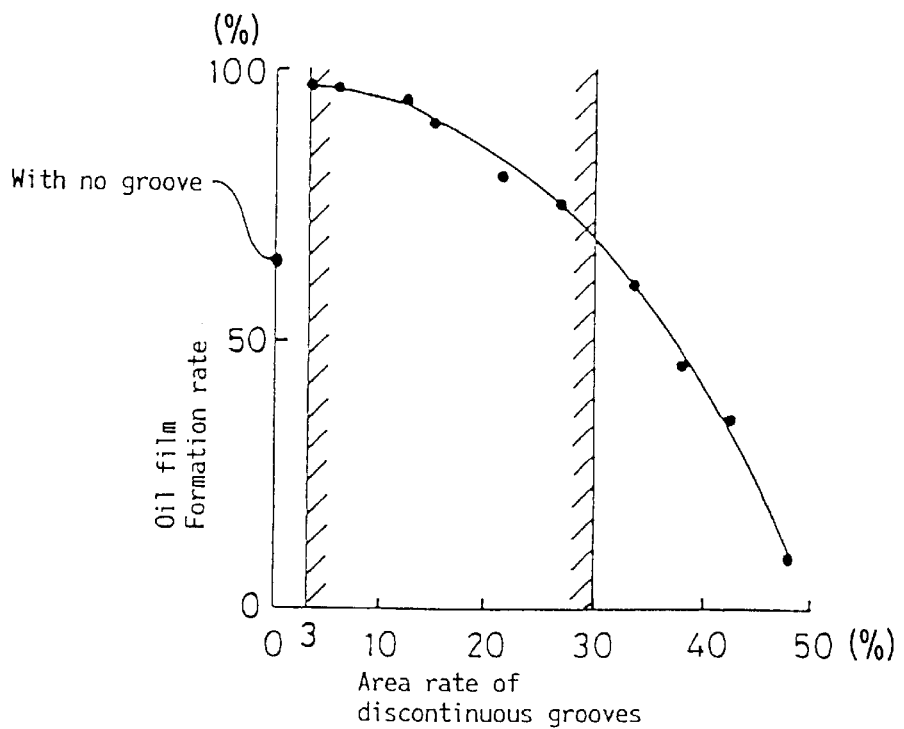
FIG. 6 is a graph showing the relationship between the area rate of the grooves and the oil film formation rate.

FIG. 6 shows the relationship between the area ratio of the discontinuous grooves 15 and the oil film forming capacity of the test cylinders.

The test cylinders measured 12 mm in outer diameter and 12 mm long, and were made of type 2 bearing steel (SUJ2) having a hardness HRC of 62.

The discontinuous grooves 15 of each test cylinder were formed by a cup wheel having an abrasive grain size of #270. Each discontinuous groove 15 was 40–1230 µm long and 3–62 µm wide.

The area ratio of the discontinuous grooves was determined by observing the surface of the test cylinder under a metallographic microscope, discriminating the grooves from the ungrooved portion by use of an image processing device and calculating the ratio of the total area of the grooves to the entire observed area.

To compare the oil film forming capacity, each of the test cylinders was rotated at the speed of 0.8 m/s while kept in rolling contact with a mating cylinder made of JIS SUJ2 (with hardness of HRC62) and measuring 40 mm in outer diameter and 12 mm wide with a 60-mm-diameter crowning formed on the outer-diameter surface, under the maximum contact pressure of 1.7 GPa, using turbine oil as a lubricant. The formation rate of oil film formed at the contact portion between each test cylinder and the mating cylinder was measured by the direct current electric resistance method.

As seen in FIG. 6, the oil film formation rate was higher than that of a conventional superfinished test cylinder formed with no grooves when the area rate of the discontinuous grooves was between 3% and 30%.

Such an increase in the oil film formation rate is considered to be due to the micro-EHL effect of the discontinuous grooves.

In contrast to the conventional EHL (elastohydrodynamic lubrication) theory, which deals with a smooth surface, the micro-EHL effect represents the effect of microscopic irregularities of a rough surface on the formation rate of fluid film.

Figure 7:
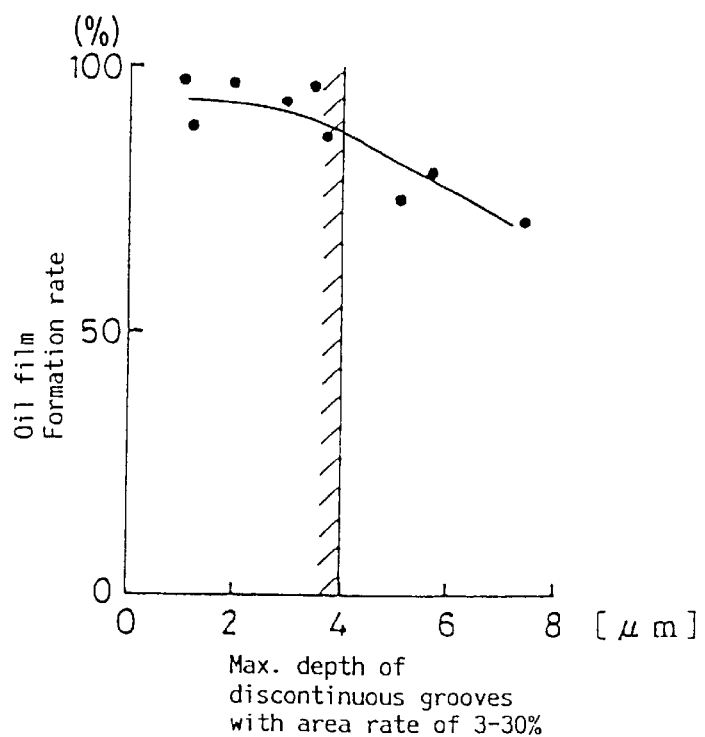
FIG. 7 is a graph showing the relationship between the maximum depth of the grooves and the oil film formation rate.

FIG. 7 shows the relationship between the maximum depth of the grooves formed in a test cylinder having grooves at the area rate of 3%–30% and the oil film formation rate. The film formation rate was measured under the same conditions as above. From this graph, it is apparent that the oil formation rate improves markedly by setting the maximum depth of the discontinuous grooves at 0.5–4 µm.

Each maximum depth shown in FIG. 7 is the average of maximum depths of grooves measured at three points for each cylinder along circumferential lines 1-mm long, using RANK TAYLOR HOBSON TALYSURF S5C.

The test results shown in FIGS. 6 and 7 are for discontinuous grooves extending substantially perpendicular to the rolling direction of the test cylinder.

Figure 8:
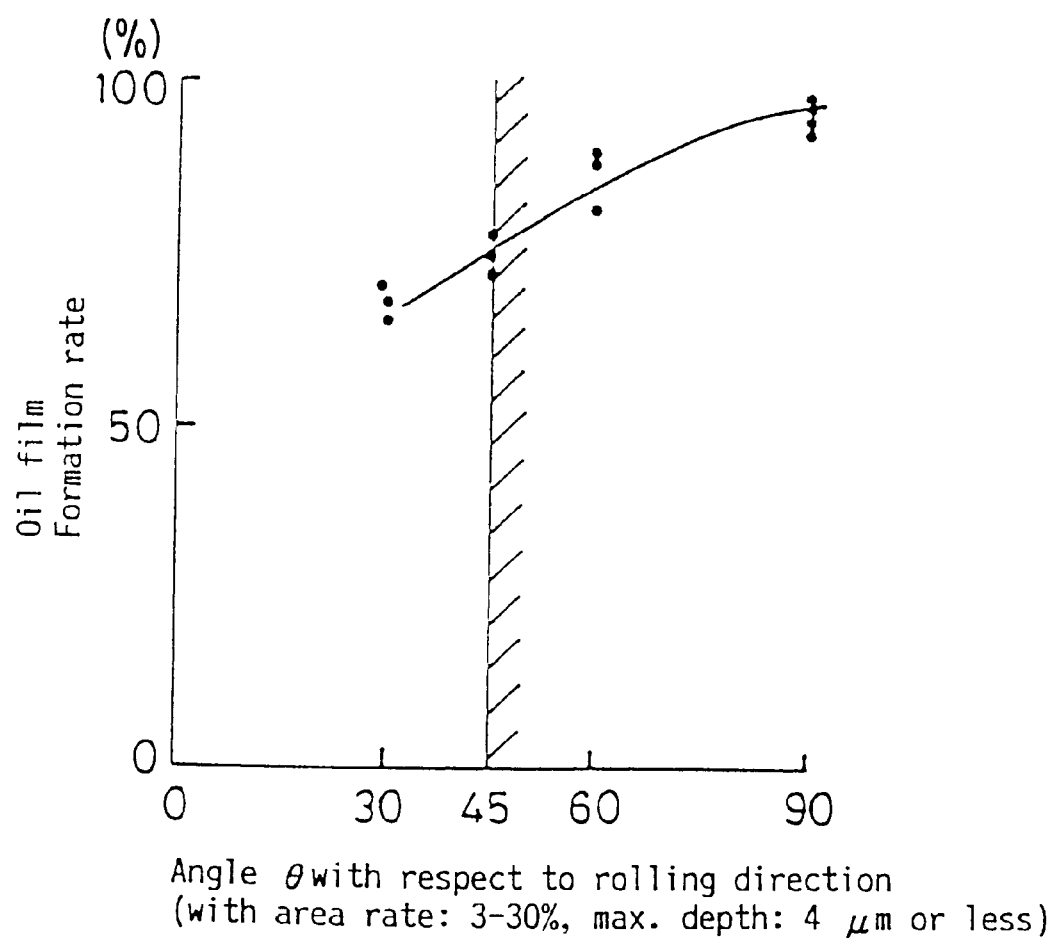
FIG. 8 is a graph showing the relationship between the angle of grooves and the oil film formation rate.

Also, we measured the oil film formation rate of the test cylinder while varying the angle θ of the discontinuous grooves 15 with respect to the rolling direction of the cylinder under the same conditions as above, with the area rate of the discontinuous grooves set at 3–30% and the maximum depth of the discontinuous grooves at 4 µm or less. The results are shown in FIG. 8. From this graph, it is apparent that the oil film formation rate improved when the angle θ is between 45 and 90 degrees.

Table 1 shows cylinders that are different from one another in the number, volume and area rate of discontinuous grooves.

The cylinders shown in Table 1 all measure 12 mm in outer diameter and 12 mm long and are made of JIS SUJ2 having a hardness (HRC) of 62.

These cylinders, which embody the present invention, had their discontinuous grooves formed with a cup wheel having an abrasive grain size of #120 or #270. They were 40 µm–1230 µm long and 3 µm–62 µm wide.

The area rate of the discontinuous grooves was measured by creating an enlarged image of a portion of the test cylinder surface with a metallographic microscope, distinguishing the grooves in the visual field from the ungrooved portion with an image processing device, and calculating the rate of the total area of the grooves to the area of the entire visual field.

The volume of the discontinuous grooves was measured by RANK TAYLOR HOBSON TALYSURF S5C and expressed in Vo, which is a measurement parameter of the measuring equipment.

Figure 11A:
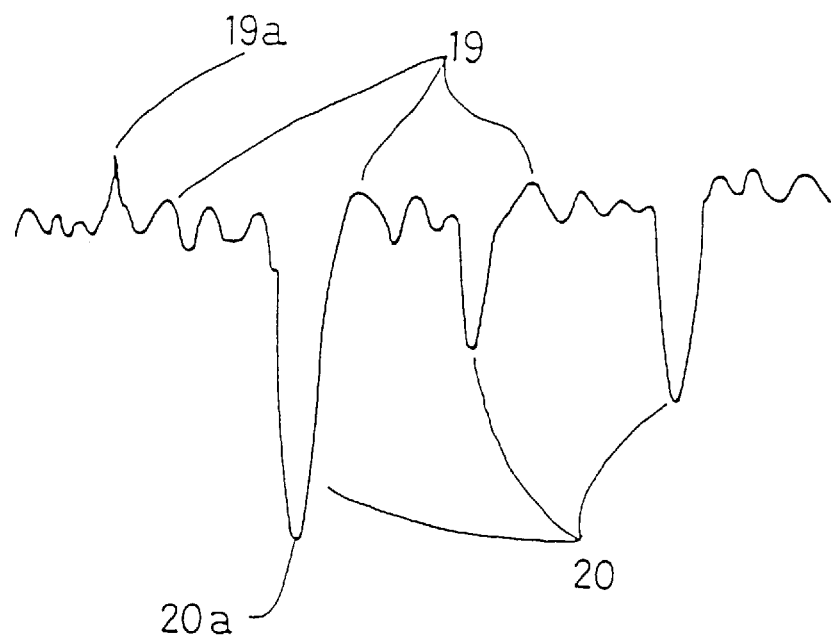
FIG. 11A is a sectional view of a rough surface.

The parameter Vo represents the volume of recesses 20 formed in a rough surface as shown in FIG. 11A. It is an integrated value of the shaded portion 21 of the cumulative density function (FIG. 11B) of the rough surface shown in FIG. 11A.

The volume of the discontinuous grooves of each cylinder shown in Table 1 is the average of volumes measured at three points for each cylinder along 1-mm-long circumferential lines.

Figure 11B:
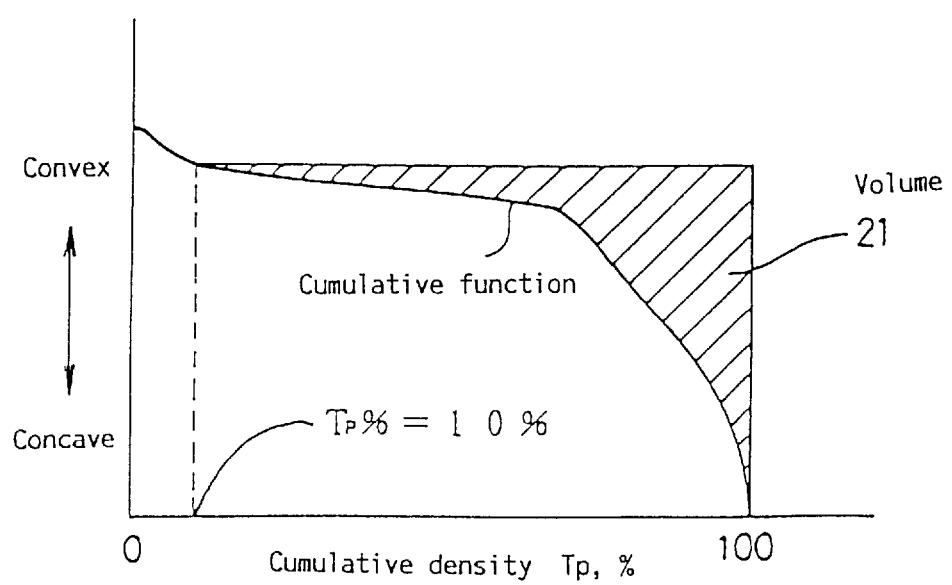
FIG. 11B is a graph showing the cumulative density function used to calculate the volume Vo of the grooves formed in the rough surface shown in FIG. 11A.

The volumes Vo were calculated with the Tp% shown in FIG. 11B set at 10%. This means that the volume 21 of the recesses 20 was calculated on the assumption that the protrusions 19 are the portions of the rough surface that are present at the top 10% region of a vertical line (in FIG. 11A) extending from the top of the highest protrusion 19a to the bottom of the deepest recess 20a.

Figure 12:
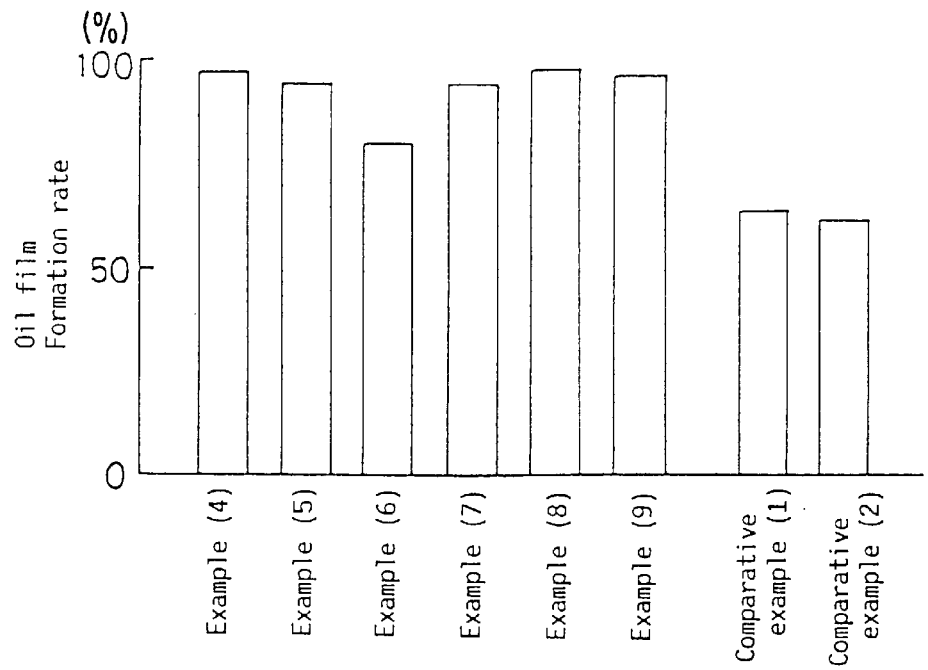
FIGS. 12 and 13 are graphs showing the oil film formation capacity of the respective cylinders.

To compare the oil film forming capacity for Test Examples (4)–(9) and Comparative Examples (1) and (2), the respective test cylinders were rotated at the speed of 0.8 m/s while kept in rolling contact with a mating cylinder made of JIS SUJ2 (HRC62) and measuring 40 mm in outer diameter and 12 mm wide with a 60-mm-diameter crowning formed on the outer-diameter surface, under the maximum contact pressure of 1.7 GPa, using turbine oil as a lubricant. The formation rate of oil film formed at the contact portion between each test cylinder and the mating cylinder was measured by a direct current electric resistance method. The results are shown in FIG. 12. The numbers of discontinuous grooves shown in the respective tables are the numbers of grooves present in a 1 mm length along a circumferential line as measured using the same device used to measure the volume of the grooves in a circumferential direction.

From FIG. 12, it is apparent that Test Examples (4)–(9) are superior in the oil film formation capacity to Comparative Examples (1) and (2). Such good results are attributable to the micro-EHL effect of the discontinuous grooves.

Table 2 shows the number and area rate of discontinuous grooves formed in the surface of each test cylinder.

The cylinders shown in Table 2 measured 12 mm in outer diameter and 12 mm long and were made of JIS SUJ2 having an HRC hardness of 62.

Such discontinuous grooves were formed on the respective cylinders with a cup wheel having an abrasive grain size of #120 or # 270. They were 40 $\mu$m–1230 $\mu$m long and 3 $\mu$m–62 $\mu$m wide. The area rate of the discontinuous grooves was measured by creating an enlarged image of a portion of the test cylinder surface with a metallographic microscope, distinguishing the grooves in the visual field from the ungrooved portion with an image processing device, and calculating the rate of the total area of the grooves to the area of the entire visual field.

Figure 13:
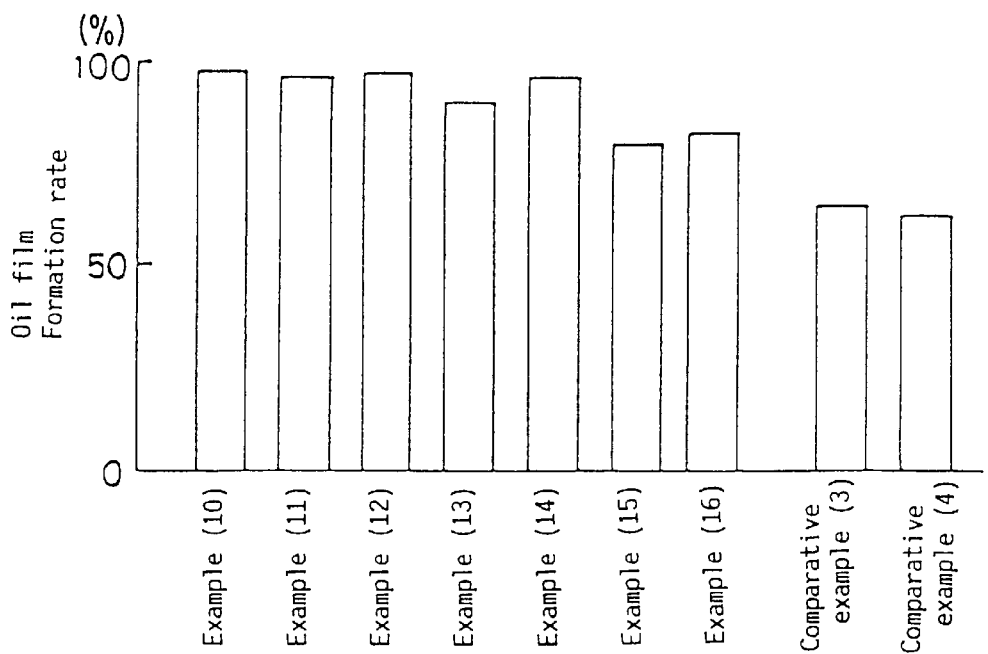

FIG. 13 shows the results of a test for comparing the oil film formation capacity of Test Examples (10)–(16) and Comparative Examples (3) and (4).

In this test, the respective test cylinders were rotated at the speed of 0.8 m/s while kept in rolling contact with a mating cylinder made of SUJ2 bearing steel (HRC62) and measuring 40 mm in outer diameter and 12 mm wide with a 60-mm-diameter crowning formed on the outer-diameter surface, under the maximum contact pressure of 1.7 GPa, using turbine oil as a lubricant. The formation rate of oil film formed at the contact portion between each test cylinder and the mating cylinder was measured by a direct current electric resistance method.

From FIG. 13, it is apparent that Test Examples (10)–(16) are superior in the oil film formation capacity to Comparative Examples (3) and (4). Such good results are attributable to the micro-EHL effect of the discontinuous grooves.

Figure 14:
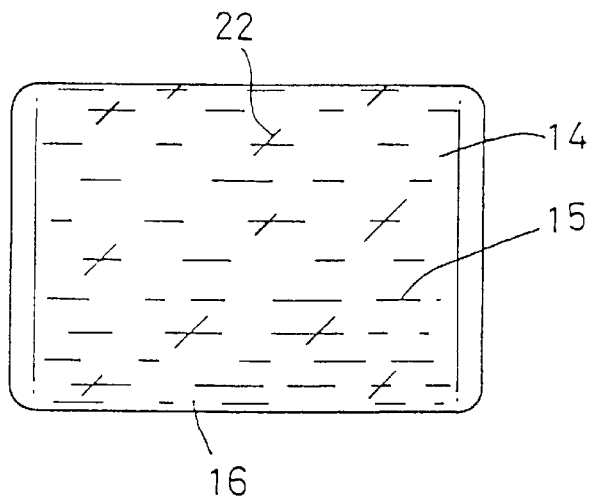
FIG. 14 is a partial enlarged front view of one of the rollers of the bearing shown in FIG. 1.

In the embodiment of FIG. 14, the rolling element shown in FIG. 1 has its rolling and sliding contact surfaces formed, entirely or partially, with a plurality of discontinuous grooves 15 having intersecting portions 22 extending across the rolling or sliding direction. The grooves 15 and 22 are discontinuous, i.e. interrupted, in their length direction. The portions other than the grooves 15 are superfinished surfaces 16. Some of the discontinuous grooves 15 intersect with other discontinuous grooves 15 at the portions 22, which are dispersedly arranged. FIG. 14 shows only the roller 14. But the other bearing elements are also formed with similar grooves.

Table 3 shows the rate of intersection of the discontinuous grooves formed in the surface of each test cylinder, and their number and area rate.

The cylinders shown in Table 3 measured 12 mm in outer diameter and 12 mm long and were made of JIS SUJ2 having an HRC hardness of 62.

On the cylinders according to the present invention such discontinuous grooves were formed on the respective cylinders with a cup wheel having an abrasive grain size of #120 or #270. They were 40 $\mu$m–1230 $\mu$m long and 3 $\mu$m–62 $\mu$m wide. The rate of intersection of the discontinuous grooves is the percentage of the number of points (n) at which the discontinuous grooves intersect with each other with respect to the total number (N) of discontinuous grooves within the visual field of a metallographic microscope (100×n/N, %).

The area rate of the discontinuous grooves was measured by creating an enlarged image of a portion of the test cylinder surface with a metallographic microscope, distinguishing the grooves in the visual field from the ungrooved portion with an image processing device, and calculating the rate of the total area of the grooves to the area of the entire visual field.

Figure 15:
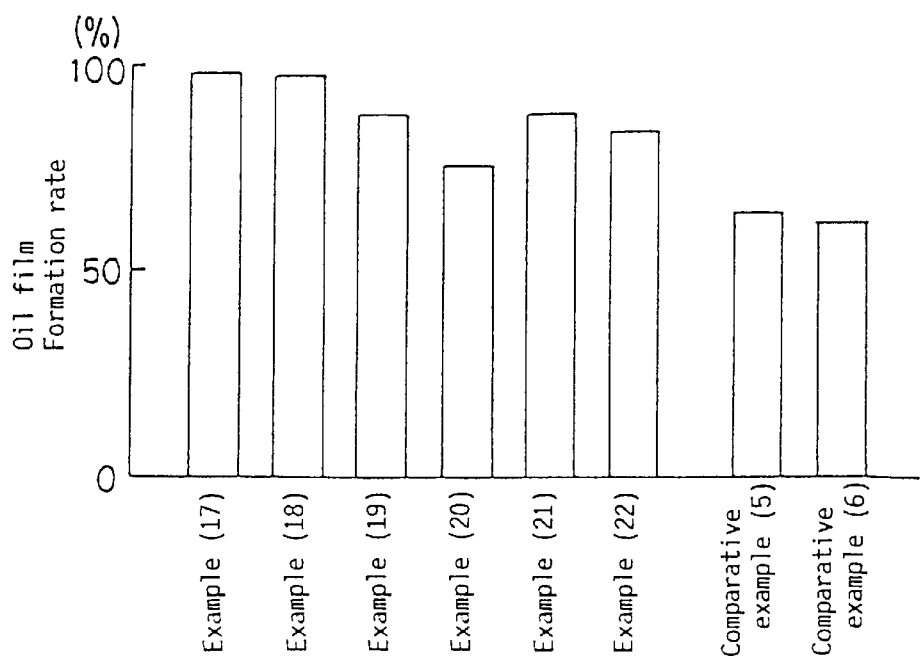
FIG. 15 is a graph showing the oil film formation capacity of the respective cylinders.

FIG. 15 shows the results of a test for comparing the oil film formation capacity of Test Examples (17)–(22) and Comparative Examples (5) and (6).

In this test, the respective test cylinders were rotated at the speed of 0.8 m/s while kept in rolling contact with a mating cylinder made of SUJ2 bearing steel (HRC62) and measuring 40 mm in outer diameter and 12 mm wide with a 60-mm-diameter crowning formed on the outer-diameter surface, under the maximum contact pressure of 1.7 GPa, using turbine oil as a lubricant. The formation rate of oil film formed at the contact portion between each test cylinder and the mating cylinder was measured by a direct current electric resistance method.

FIG. 15 shows that Test Examples (17)–(22) are superior in the oil film formation capacity to Comparative Examples (5) and (6).

Such good results are attributable to the micro-EHL effect of the discontinuous grooves.

Figure 9A:
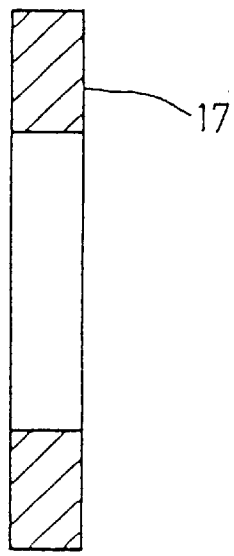
FIG. 9A is a sectional view of a thrust flat plate of a slide bearing.
Figure 9B:
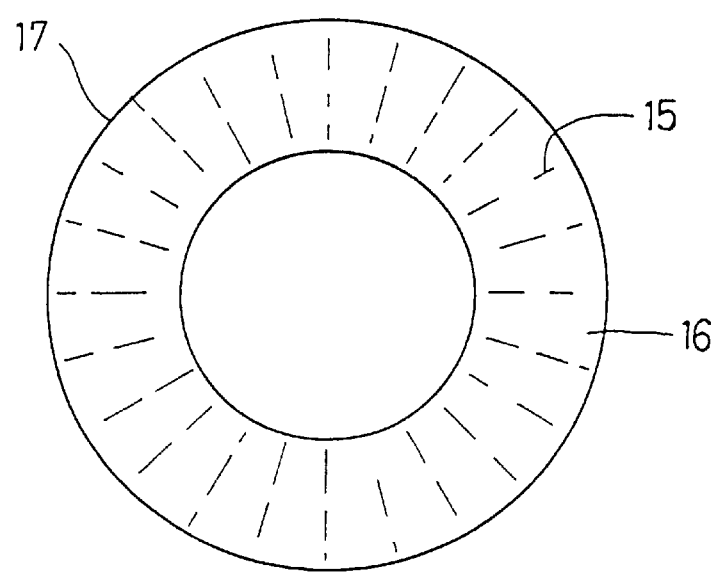
FIG. 9B is a side view of the thrust flat plate shown in FIG. 9A.
Figure 16A:
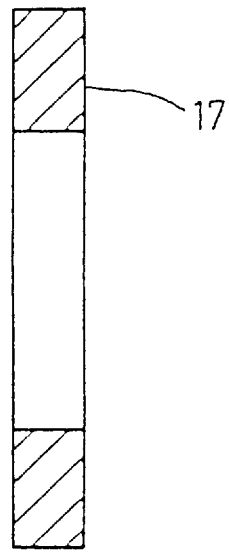
FIG. 16A is a sectional view of a thrust flat plate of a slide bearing.
Figure 16B:
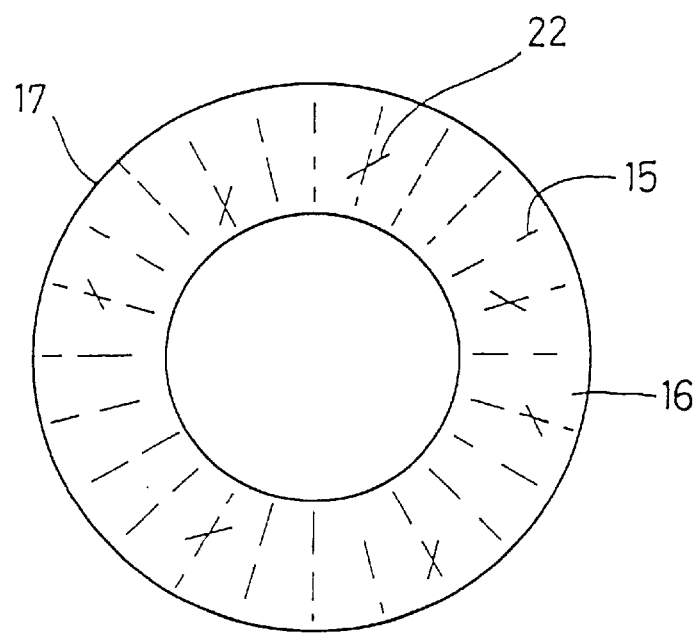
FIG. 16B is a side view of the thrust flat plate shown in FIG. 16A.

Not only to bearing elements of cylindrical roller bearings, the concept of the present invention is but also applicable to thrust flat plates 17 of slide bearings as shown in FIGS. 9A, 9B, 16A and 16B. The thrust flat plate 17 shown in FIGS. 9A and 9B are formed, on its slide contact surface, with radial discontinuous grooves 15 similar to the abovementioned grooves 15. The thrust flat plate 17 shown in FIGS. 16A and 16B is formed, on its slide contact surface, with radial discontinuous grooves 15, some of which have intersecting portions 22 similar to the aforementioned portions 22.

Figure 10:
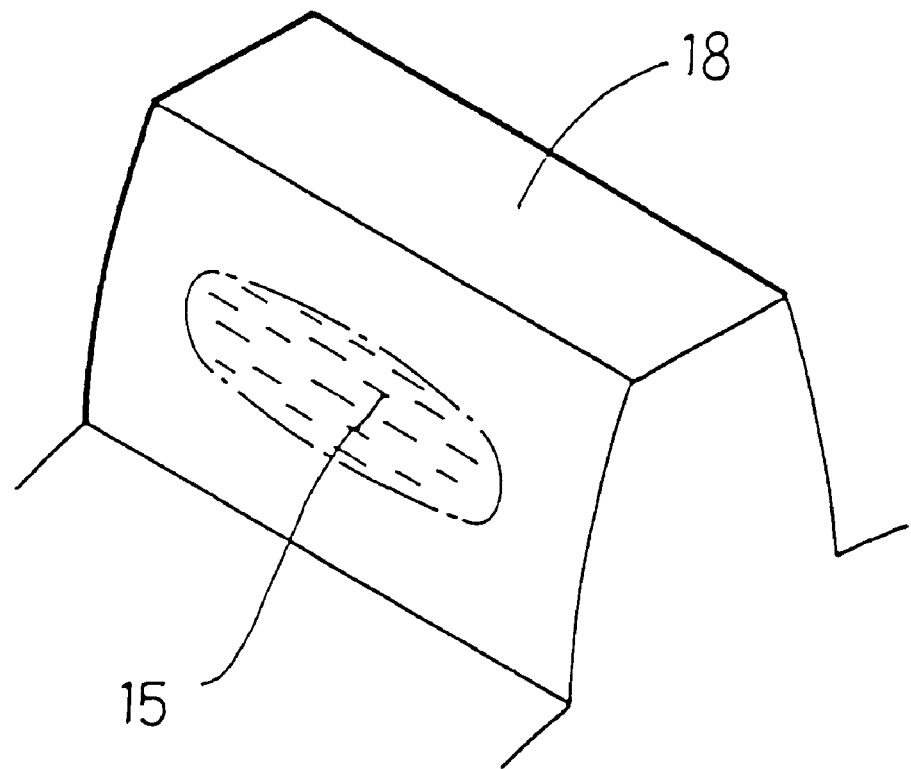
FIG. 10 is a partial enlarged perspective view of a gear.
Figure 17:
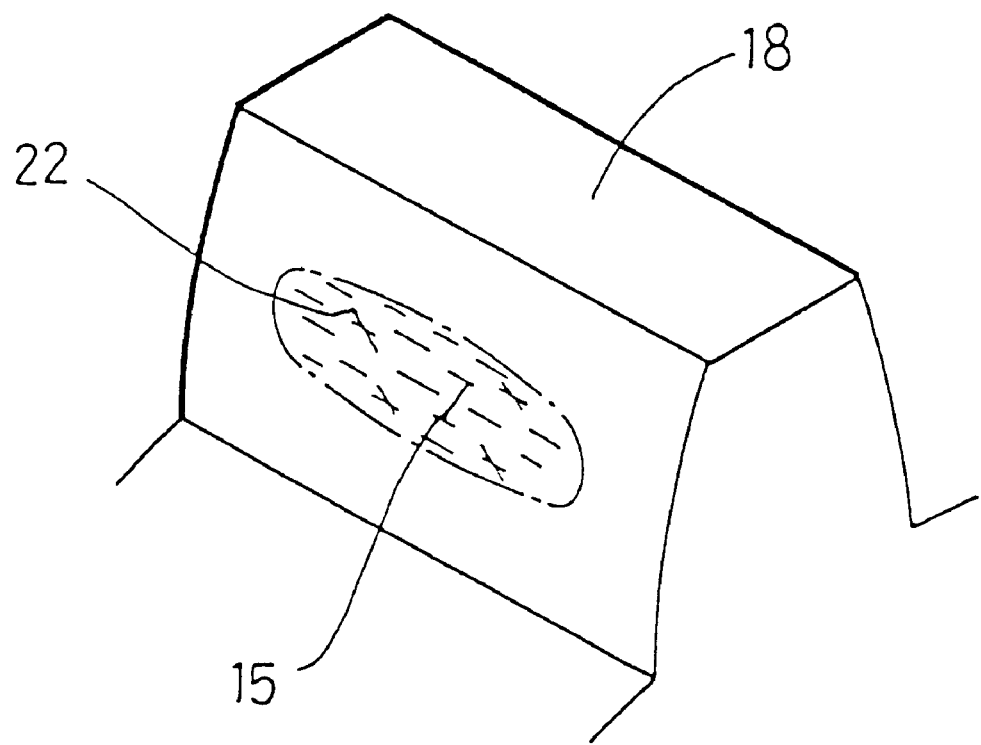
FIG. 17 is a partial enlarged perspective view of a gear.

Such discontinuous grooves 15 may be formed on tooth flanks of a gear 18 as shown in FIG. 10. Also, as shown in FIG. 17, discontinuous grooves 15, some of which have intersecting portions 22, may be formed on the tooth flanks of a gear 18.

According to the present invention, it is possible to improve the oil film formation capacity of a rolling or sliding machine part, typically a rolling bearing, at its contact portion. Such a machine part will exhibit a long life.

TABLE 1

| | Discontinuous grooves | | | |
|---|---|---|---|---|
| | Present or not? | Volume (mm³/cm²) | Number (per mm) | Area rate (%) |
| Example (4) | Yes | 150 | 4 | 3 |
| Example (5) | Yes | 350 | 9 | 13 |
| Example (6) | Yes | 390 | 15 | 29 |
| Example (7) | Yes | 50 | 4 | 7 |
| Example (8) | Yes | 60 | 1 | 7 |
| Example (9) | Yes | 240 | 7 | 6 |
| Comparative Example (1) | No | 0 | 0 | 0 |
| Comparative Example (2) | No | 0 | 0 | 0 |

TABLE 2

| | Discontinuous grooves | | |
|---|---|---|---|
| | Present or not? | Number (per mm²) | Area rate (%) |
| Example (10) | Yes | 5 | 7 |
| Example (11) | Yes | 8 | 3 |
| Example (12) | Yes | 11 | 7 |
| Example (13) | Yes | 24 | 15 |
| Example (14) | Yes | 34 | 13 |
| Example (15) | Yes | 41 | 27 |
| Example (16) | Yes | 50 | 29 |
| Comparative Example (3) | No | 0 | 0 |
| Comparative Example (4) | No | 0 | 0 |

TABLE 3

| | Discontinuous grooves | | | |
|---|---|---|---|---|
| | Present or not? | Intersection rate (%) | Number (per mm²) | Area rate (%) |
| Example (17) | Yes | 0 | 5 | 3 |
| Example (18) | Yes | 0 | 10 | 6 |
| Example (19) | Yes | 10 | 24 | 15 |
| Example (20) | Yes | 20 | 49 | 29 |
| Example (21) | Yes | 2 | 39 | 15 |

TABLE 3-continued

| | Discontinuous grooves | | | |
|---|---|---|---|---|
| | Present or not? | Intersection rate (%) | Number (per mm²) | Area rate (%) |
| Example (22) | Yes | 14 | 18 | 13 |
| Comparative Example (5) | No | 0 | 0 | 0 |
| Comparative Example (6) | No | 0 | 0 | 0 |

What is claimed is:

1. A machine part comprising:
    an element having a rolling contact surface or a sliding contact surface formed with a plurality of discontinuous grooves for receiving a fluid lubricant,
    said discontinuous grooves being arranged in said rolling or sliding contact surface so as to extend across a rolling or sliding direction of said element, wherein said grooves form an angle of 45 to 90 degrees with a line extending in the rolling or sliding direction.

2. The machine part as claimed in claim 1, wherein said discontinuous grooves have a maximum depth of 0.5–4 $\mu$m.

3. The machine part as claimed in claim 1, wherein said discontinuous grooves define a volume of from $50 \times 10^{-4}$ mm³/cm² to $400 \times 10^{-4}$ mm³/cm² of said rolling or sliding contact surface, and said rolling or sliding contact surface is a smooth surface except for said discontinuous grooves.

4. The machine part as claimed in claim 3, wherein said discontinuous grooves number 1–15 grooves per millimeter of said rolling or sliding contact surface in the rolling or sliding direction.

5. The machine part as claimed in claim 1, wherein said discontinuous grooves number 5–50 grooves per square millimeter of said rolling or sliding contact surface.

6. The machine part as claimed in claim 1, wherein an area rate of said discontinuous grooves relative to said rolling or sliding contact surface is 3–30%.

7. The machine part as claimed in claim 6, wherein said discontinuous grooves have a maximum depth of 0.5–4 $\mu$m.

8. The machine part as claimed in claim 7, wherein said discontinuous grooves define a volume of from $50 \times 10^{-4}$ mm³/cm² to $400 \times 10^{-4}$ mm³/cm² of said rolling or sliding contact surface, and said rolling or sliding contact surface is a smooth surface except for said discontinuous grooves.

9. The machine part as claimed in claim 8, wherein said discontinuous grooves number 1–15 grooves per millimeter of said rolling or sliding contact surface in the rolling or sliding direction.

10. The machine part as claimed in claim 6, where said discontinuous grooves number 5–50 grooves per square millimeter of said rolling or sliding contact surface.

11. The machine part as claimed in claim 1, wherein some of said discontinuous grooves intersect with each other.

12. The machine part as claimed in claim 11, wherein said discontinuous grooves number 5–50 grooves per square millimeter of said rolling or sliding contact surface.

13. The machine part as claimed in claim 12, wherein said discontinuous grooves intersect at a rate of more than 0% but not more than 20%.

14. The machine part as claimed in claim 11, wherein said discontinuous grooves number 5–50 grooves per square millimeter of said rolling or sliding contact surface.

15. The machine part as claimed in claim 1, wherein said discontinuous grooves are formed with a cup wheel having abrasive grains.

* * * * *